United States Patent
King et al.

(10) Patent No.: US 7,181,604 B2
(45) Date of Patent: Feb. 20, 2007

(54) METHOD AND APPARATUS FOR CONFIGURING THE BOOT OPTIONS OF A MULTI-DOMAIN SYSTEM

(75) Inventors: James E. King, Wokingham (GB); Brian M. Somers, Amersham (GB); Brian J. Gillespie, Dublin (IE)

(73) Assignee: Sun Microsystems, Inc., Santa Clara, CA (US)

( * ) Notice: Subject to any disclaimer, the term of this patent is extended or adjusted under 35 U.S.C. 154(b) by 583 days.

(21) Appl. No.: 10/365,806

(22) Filed: Feb. 13, 2003

(65) Prior Publication Data

US 2004/0162977 A1 Aug. 19, 2004

(51) Int. Cl.
*G06F 15/177* (2006.01)
*G06F 13/00* (2006.01)

(52) U.S. Cl. .............................. 713/1; 713/2; 713/100; 709/220; 709/221; 710/104

(58) Field of Classification Search ............ 713/1, 713/2, 100
See application file for complete search history.

(56) References Cited

U.S. PATENT DOCUMENTS

| | | | |
|---|---|---|---|
| 6,199,160 B1 * | 3/2001 | Echensperger et al. | 713/100 |
| 6,347,372 B1 * | 2/2002 | Takashima et al. | 713/2 |
| 6,446,203 B1 * | 9/2002 | Aguilar et al. | 713/2 |
| 6,687,818 B1 * | 2/2004 | Svenkeson et al. | 713/2 |
| 6,757,824 B1 | 6/2004 | England | |
| 2002/0078290 A1 | 6/2002 | Derrico et al. | |
| 2003/0009654 A1 * | 1/2003 | Nalawadi et al. | 713/1 |
| 2004/0010680 A1 * | 1/2004 | Smith et al. | 713/1 |

FOREIGN PATENT DOCUMENTS

| | | |
|---|---|---|
| EP | 1316890 A2 | 11/2002 |
| WO | 03/044666 A2 | 11/2002 |

OTHER PUBLICATIONS

Search Report, Application No. GB0400106.1, mailed May 26, 2004.

* cited by examiner

*Primary Examiner*—Lynne H. Browne
*Assistant Examiner*—Michael J. Brown
(74) *Attorney, Agent, or Firm*—Meyertons Hood Kivlin Kowert & Goetzel, P.C.; B. Noël Kivlin

(57) ABSTRACT

A computing system comprises multiple domains, each having an independent boot process. This boot process involves the selection of one boot option from a list of potentially multiple boot options available to the domain. The apparatus further comprises a centralized configuration utility, and a boot controller within each domain. The boot controller supplies said configuration utility with the list of boot options available to that domain. The configuration utility allows a user to specify en bloc the boot option for multiple domains. This information is then passed back to the boot controllers of the respective domains, which then boot in accordance with the boot option specified by said configuration utility.

32 Claims, 9 Drawing Sheets

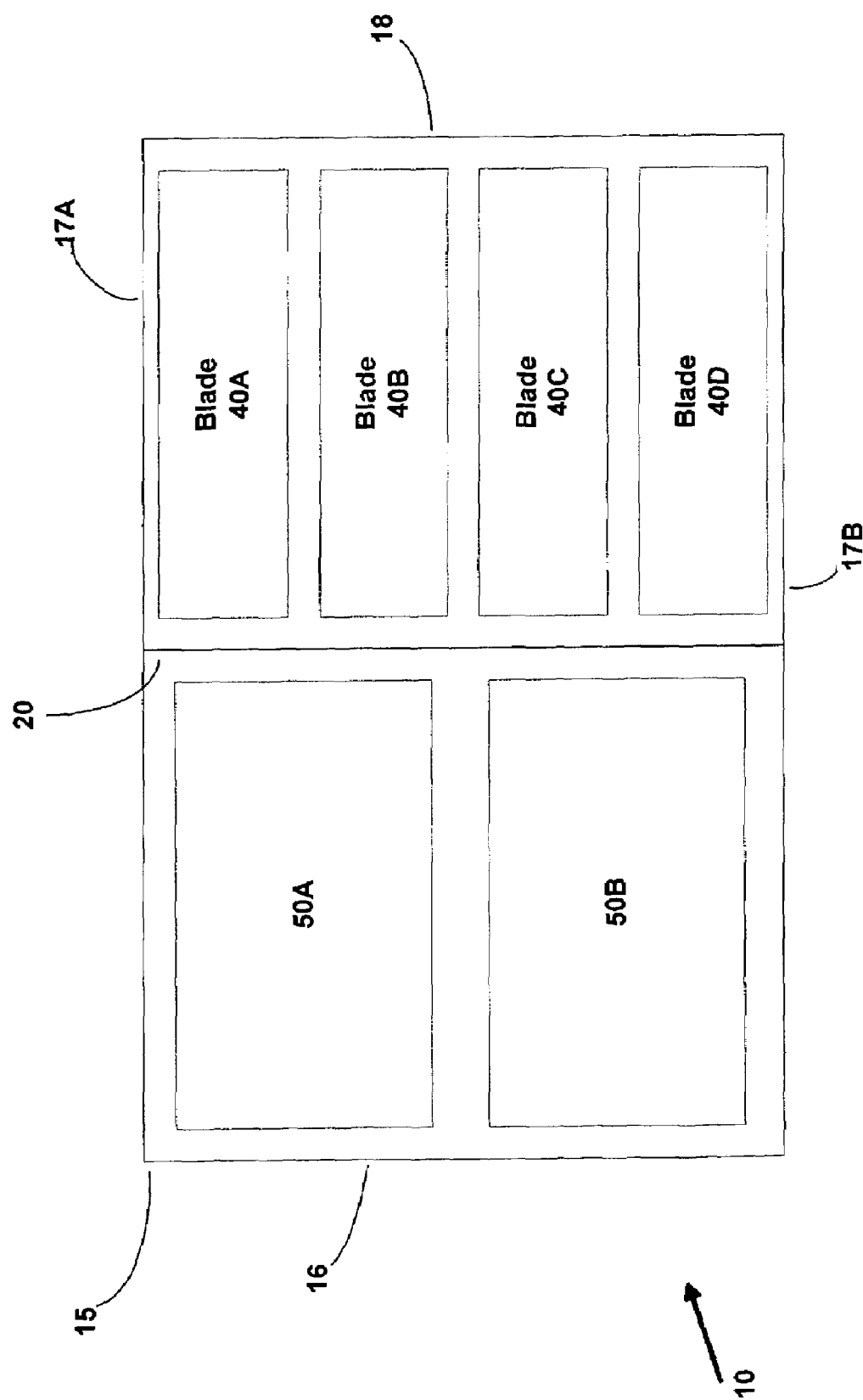

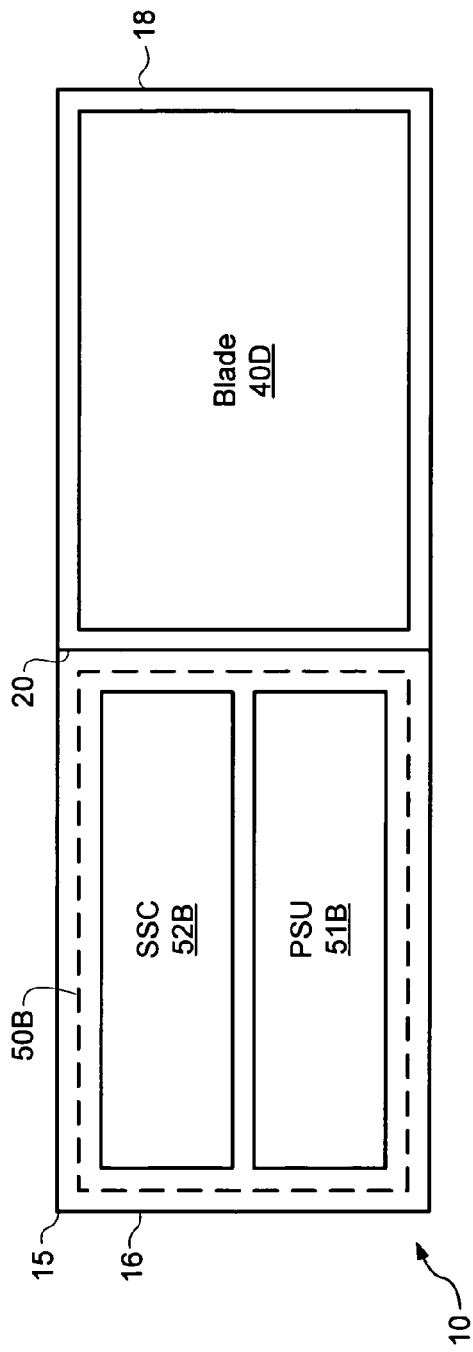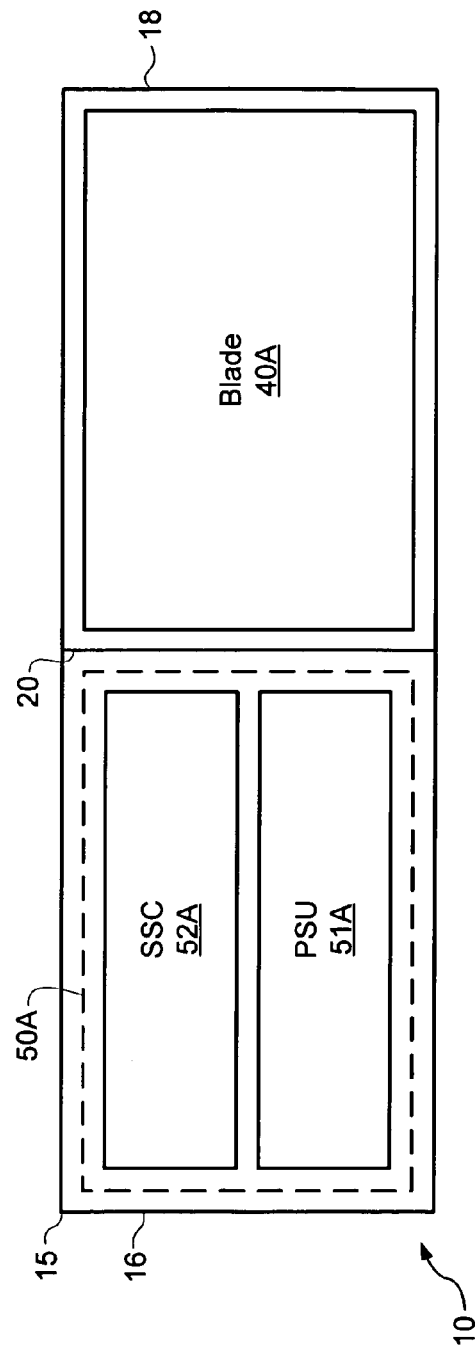
Figure 2A
Figure 2B

METHOD AND APPARATUS FOR CONFIGURING THE BOOT OPTIONS OF A MULTI-DOMAIN SYSTEM

FIELD OF THE INVENTION

The present invention relates to computer systems and such-like having multiple domains, and in particular to the configuration of boot options of various domains within a system.

BACKGROUND OF THE INVENTION

A significant trend in modern computing is for commercial organizations to rent or lease processing resources, and especially Web server capacity, from a service provider, rather than using their own in-house systems. Typically the computer systems are owned and operated by the service provider, but are then used to run various applications as required by the commercial organizations.

A major advantage of this approach for the commercial organisation is that it allows them much more flexibility, especially if their system demands are liable to significant fluctuations on a relatively short timescale. This can often be the case, for example, if a special advertising promotion is being run. This will (hopefully) generate an intense peak of on-line inquiries, orders, and so on. The commercial organisation temporarily acquires the additional computing power to cope with this increase by leasing or renting capacity from the service provider.

Usually a service provider will be hosting multiple applications at the same time, on behalf of one or more customers. A typical installation for a service provider has multiple computing systems, each comprising one or more domains. Each domain runs its own operating system and has processing facilities that are largely independent from other domains.

The advantage of a multi-domain structure is that it provides a flexible and scalable architecture. Thus typically a domain runs only one application at a time. In cases of high demand, multiple domains can be assigned to the same application (or more accurately, a separate copy of the same application can be run on different domains) in order to satisfy this demand. Conversely, multiple applications having low priority may in some situations run in parallel on a single domain. This multiple domain approach is also robust, in that if one particular domain fails, then its processing can be reassigned to one or more other domains.

An important consideration in the operation of such systems is ease of reconfiguration. Thus it can be necessary to assign resources (i.e. domains) from one application to another application relatively quickly in order to meet real-time shifts in demand. An example of where this situation might arise is when the demand for a particular task (such as responding to requests for a given Web site) is significantly greater than anticipated (or indeed a lot less than anticipated). This may involve a re-boot of the relevant domain, for example if the new application is to run on a different operating system from the previous application. It will be appreciated that having to perform such re-configuration separately for each individual domain represents a time-consuming task.

SUMMARY OF THE INVENTION

Thus in accordance with one embodiment of the invention there is provided apparatus comprising multiple domains, wherein each domain has an independent boot process. The boot process involves the selection of one boot option from a list of potentially multiple boot options available to the domain. The apparatus further comprises a configuration utility and a boot controller within each domain. The boot controller supplies the configuration utility with the list of boot options available to that domain. (This list of options is typically stored and maintained by the boot controller). The configuration utility allows a user to specify en bloc the boot option for multiple domains. The boot controllers then cause their respective domains to boot in accordance with the boot option specified by the configuration utility.

It will be appreciated that in this manner, the configuration and management of a complex multi-domain system are considerably eased, in that it is possible for a user to specify a common or shared boot configuration across multiple blades, as opposed to having to do this on an individual basis for each domain.

There are various possible timings for the configuration process. Typically, a user decides to update the boot configurations for a system that is already running. In this situation, the various boot options are requested from the domains (unless this is already available from information supplied at boot time). The user then performs a configuration update, and this is disseminated back to the relevant domains. (Note that the user may decide to specifically cause one or more domains to reboot at this point).

In some circumstances, the reconfiguration may be largely automatic. For example, a first set of domains may run one application, and a second set of domains may run another application. If it is detected that the first set is becoming saturated (i.e. there is no spare capacity), then a group of domains may be moved from the second set to the first set. In order to do this, the configuration utility may have to specify a different boot option for the domains involved, and then reboot them with this new option, so that they now come up running the first application.

Typically one of the boot options is identified as a default option. This is the option that is used to boot a domain if instructions to the contrary are not provided within a predetermined time. Note that the configuration utility can be used to update the default option across the set of domains.

In some embodiments, one of the available boot options is a network boot option, where the domain downloads code from the network. The configuration utility allows a user to specify the network address for such a network boot option. Again, this can be done en bloc for multiple domains, rather than having to do it on an individual basis for each domain. Note that a domain may not directly access the specified network address, but rather may pass this information to a centralized boot server (typically running the dynamic host control protocol or DHCP). This then allows the DHCP server to instruct the blade to boot up from the relevant address.

Typically the configuration utility allows a user to rank at least some of the boot options in order of preference, such as a primary boot option, a secondary boot option, a tertiary boot option, and so on. The boot controller causes the domain to boot in accordance with the secondary boot option if the primary boot option is unavailable. For example, the primary option may specify booting from a particular network address, but if this is unavailable, then the secondary boot option may specify a different network address, or a local boot option. (If the secondary boot option is unavailable, then the tertiary boot option, if any, is tried, and so on).

In accordance with another embodiment of the invention, there is provided a domain suitable for use in a multi-domain apparatus such as described above. The domain has a boot process that includes the selection of one boot option from a list of potentially multiple boot options available to the domain. In addition, the domain has a boot controller that is operable to supply a configuration utility with the list of boot options available to that domain. The boot controller also causes the domain to boot in accordance with a boot option specified by said configuration utility.

In accordance with another embodiment of the invention, there is provided a method of operating apparatus comprising a configuration utility and multiple domains. Each of the domains has an independent boot process and a boot controller. The boot process involves the selection of one boot option from a list of potentially multiple boot options available to the domain. The method begins with supplying from the boot controller to the configuration utility the list of boot options available to that domain. The configuration utility is used to specify en bloc a boot option for multiple domains, and each domain is then booted in accordance with the boot option specified by the configuration utility.

In accordance with another embodiment of the invention, there is provided a method of operating a domain for use in a multi-domain system having a shared configuration utility. Each of the domains has an independent boot process and a boot controller. The boot process involves the selection of one boot option from a list of potentially multiple boot options available to the domain. The method comprises supplying from the boot controller to the configuration utility the list of boot options available to that domain, and causing the domain to boot in accordance with the boot option specified by the configuration utility. Note that the boot option may be specified as being common across multiple domains.

In accordance with another embodiment of the invention, there is provided a computer program product comprising instructions on a medium for loading into an apparatus comprising multiple domains. Each domain in the apparatus has an independent boot process involving the selection of one boot option from a list of potentially multiple boot options available to the domain. The instructions allow a configuration utility on the apparatus to receive from a boot controller on each domain a list of the boot options available to that domain, and to specify en bloc the boot option for multiple domains. The configuration utility informs the respective boot controllers of the specified boot option, thereby allowing the boot controllers to boot the domains in accordance with the boot option specified by the configuration utility.

Such program instructions are typically stored on a hard disk of a computer system and loaded for use into random access memory (RAM) for execution by a system processor. Note that rather than being stored on the hard disk or other form of fixed storage, part or all of the program instructions may also be stored on a removable storage medium, such as an optical (CD ROM, DVD, etc) or magnetic (floppy disk, tape, etc) device. Alternatively, the program instructions may be downloaded via a transmission signal medium over a network, for example, a local area network (LAN), the Internet, and so on. In one particular embodiment, the program instructions are executed on a service processor.

It will be appreciated that the method and computer program product embodiments of the invention will generally benefit from the same particular features as the apparatus embodiments of the invention.

BRIEF DESCRIPTION OF THE DRAWINGS

Various embodiments of the invention will now be described in detail by way of example only with reference to the following drawings in which like reference numerals pertain to like elements and in which:

FIG. 1 is a schematic plan view of a shelf of a rack-mounted computer system in accordance with one embodiment of the invention;

FIG. 2A is a side elevation view of the shelf of the rack-mounted computer of FIG. 1;

FIG. 2B is another side elevation view of the shelf of the rack-mounted computer of FIG. 1;

DETAILED DESCRIPTION

Figure 3:
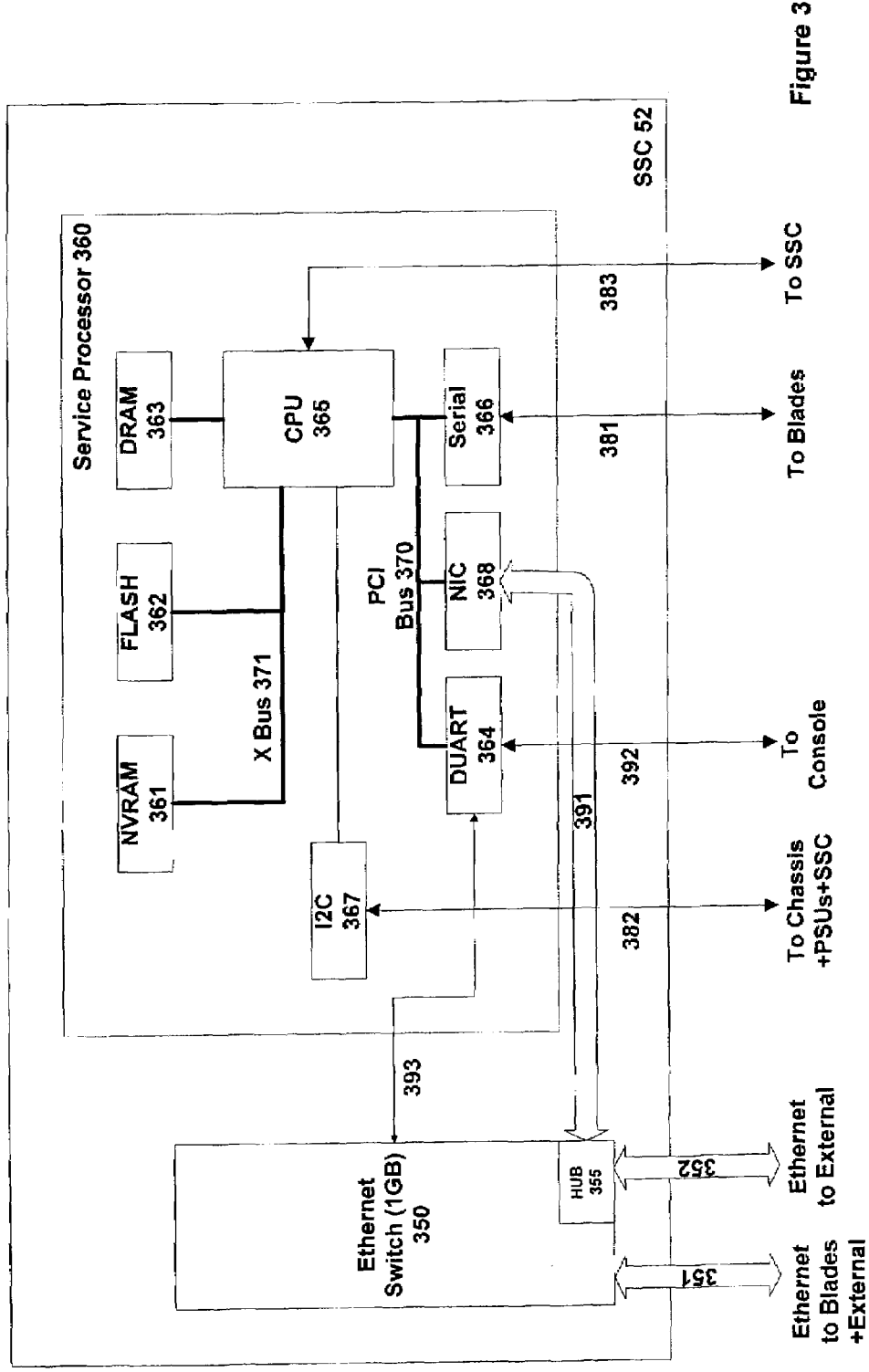
FIG. 3 is a block diagram of a switching and service controller as used in the rack-mounted computer system of FIGS. 1 and 2A.

FIG. 1 illustrates a rack-mounted computer system 10, which is typically utilised as a server machine. More particularly, FIG. 1 depicts a plan view of the contents of one shelf (it will be appreciated that system 10 may incorporate additional shelves), from which it will be apparent that computer system 10 includes a frame or chassis 15. The chassis 15 incorporates a mid-plane 20, which provides a set of connections between components in the front portion of the chassis and those in the rear portion of the chassis. (For orientation purposes, the front wall of the chassis is denoted in FIG. 1 by the reference numeral 18, and the rear wall by the reference numeral 16, with the side walls being marked as 17A and 17B).

The front portion of the chassis is occupied by four processing units known as blades, 40A, 40B, 40C and 40D, which provide the primary processing power of system 10. For clarity, FIG. 1 shows only four blades, but in one particular embodiment a shelf can accommodate up to 16 blades. It will be appreciated that in any given system, one or more blade unit slots may be empty, depending upon the particular computing requirements for that installation.

Each of the blade units 40 is generally similar, although there may be certain differences between them, for example in relation to the amount of memory provided on a particular blade. The blades 40 run independently of one another as separate domains, although groups of two or more blade units may be configured to run in combination for the same application. In this manner, system 10 provides a highly flexible computing resource. Furthermore, the presence of multiple blades provides protection against the failure of a blade unit, in that its processing tasks can then be transferred to one or more other blade units, if so desired.

The rear portion of the chassis is occupied by the components denoted schematically in FIG. 1 as 50A and 50B. The arrangement of these components is seen more easily in FIG. 2A, which is a side elevation of system 10, as if seen looking through side wall 17B. It will be apparent from FIG. 2A that space 50B is occupied by two separate devices, one located on top of the other. The lower device is a power supply unit (PSU) 51B, which provides power to the chassis and to the components therein. The upper component in the rear portion of the chassis is a switching and service controller (SSC) 52B, whose purpose will be described in more detail below.

Note that the chassis actually contains two power supply units 51A, 51B and two SSCs 52A, 52B. Thus there is one pairing of PSU 51B and SSC 52B located in block 50B, while a corresponding pairing of PSU 51A and SSC 52A is located in block 50A, as shown in FIG. 2B. It will be appreciated that by duplicating both the PSU 51 and the SSC 52, the system 10 is provided with redundancy protection against the failure of any one of these units.

It will also be recognized that the particular server configuration of FIG. 1 is provided by way of example only, and that the skilled person is aware of a wide range of other potential arrangements and configurations for servers and for computer systems in general.

FIG. 3 illustrates the SSC 52 of system 10 in more detail. In one embodiment, the SSC comprises two main components, a 1 Gbit Ethernet switch facility 350 and a service processor 360. Each of these two components is formed as a separate printed circuit board (PCB), with the service processor PCB being mounted as a mezzanine PCB on the switch PCB 350. The Ethernet switch has an Ethernet connection 351 to each of the blades 40 and also to an external network, and a further Ethernet connection 352 via hub 355 that provides separate access to an external network. The Ethernet switch 350 therefore allows data to be transmitted at a high capacity via link 351 between the different blades 40 of system 10, as well as being transferred to or from the network. In normal operations, the Ethernet switches in both SSCs 52A, 52B are concurrently active (i.e. an active-active configuration), in order to provide maximum switching capacity. Note that the internal configuration of switch 350 is not shown in detail in FIG. 3, since it is not directly relevant to an understanding of the present invention.

The other main component of the SSC 52 is the service processor 360. At the heart of the service processor 360 is a CPU 365, which in one particular embodiment is a PowerPC chip from Motorola Corporation. This is provided with dynamic random access memory (DRAM) 363 and non-volatile random access memory (NVRAM) 361 to support its processing operations, the latter being attached by an X-bus 371. Also connected to the CPU 365 via X-bus 371 is flash memory 362, which in one particular embodiment has a capacity of 16 Mbytes. This is used as a non-volatile store to hold the software to be executed by CPU 365. In particular, flash memory 362 typically stores a loader routine that allows the service controller 360 to boot up, an operating system, which in one embodiment is the VxWorks operating system, available from Wind River Systems Incorporated (see www.windriver.com), and a service control application including a configuration utility.

The service processor 360 also includes a PCI bus 370, to which is attached a dual universal asynchronous receiver and transmitter (DUART) unit 364. The DUART unit 364 provides two serial connections from the service processor 360, the first representing a link 392 to an external console (not shown in FIG. 3), while the second 393 is connected to the switch 350 (on the same SSC 52). The console link 392 allows a user to access various control and administration programs on the service processor, in order to manage operations of system 10. Thus the console can be used to configure the service processor 360, and through it also the individual blades 40.

PCI bus 370 also connects the CPU 365 to a serial bridge 366, which is linked to a serial connection 381 that runs to each of the blade units 40. This is used by the service controller 360 to send appropriate commands to the blade units, and then to receive data and responses back from the blade units. CPU 365 also has a direct serial link 383 to the other SSC in the system, which therefore allows either service processor 360 to take responsibility for overall control and monitoring of the system.

Further attached to the PCI bus 370 is a network interface card 368, which provides an external Ethernet connection via link 391 to hub 355 on the switch 350, and from there over Ethernet link 352. The service controller software supports a management network interface that exposes the diagnostic and operational information collected by the service controller 360 to external application programs. This external monitoring can be performed either from a console, over link 392, or from a remote system over link 391 and an attached network, such as the Internet (not shown in FIG. 3). This external management facility may be used to perform system administration and configuration tasks, such as determining which application will run on which blade, and so on.

The SSC 52 also includes an I2C bridge 367, which connects to an I2C link 382. The I2C link runs to the chassis and to each of the power supply units 51A, 51B, as well as to the other SSC. Note that I2C is an industry standard bus for obtaining diagnostic operating information, such as regarding temperatures and voltages, and was originally developed by Philips Electronics N.V. of the Netherlands. Further information about I2C is available at page /buses/i2c/available from the site: www.semiconductors.philips.com.

In one particular embodiment, the pair of service processor 360A and a second service processor (corresponding to the service processor in SSC 52A and 52B respectively) operate in active-standby mode. In other words, at any given time, only one of the pair of service processors is actively controlling the operation of system 10. The other (stand-by) service processor then monitors the active service processor, in order to ensure that it is operating properly. If a fault is detected in the active service processor, the stand-by service controller then takes over responsibility for monitoring the system 10 (i.e. the stand-by service processor becomes the active service processor).

Note that although not specifically shown in FIG. 3, in one embodiment the physical routing of each external link from service processor 360 is via the PCB for switch 350. Furthermore, for simplicity, Ethernet links 351 and 352, serial links 381 and 383, and I2C link 382 are each shown in FIG. 3 as single connections. However, it will be appreciated that in practice these links will be implemented using any suitable routing, and by as many separate connections to their respective targets as appropriate.

Figure 4:
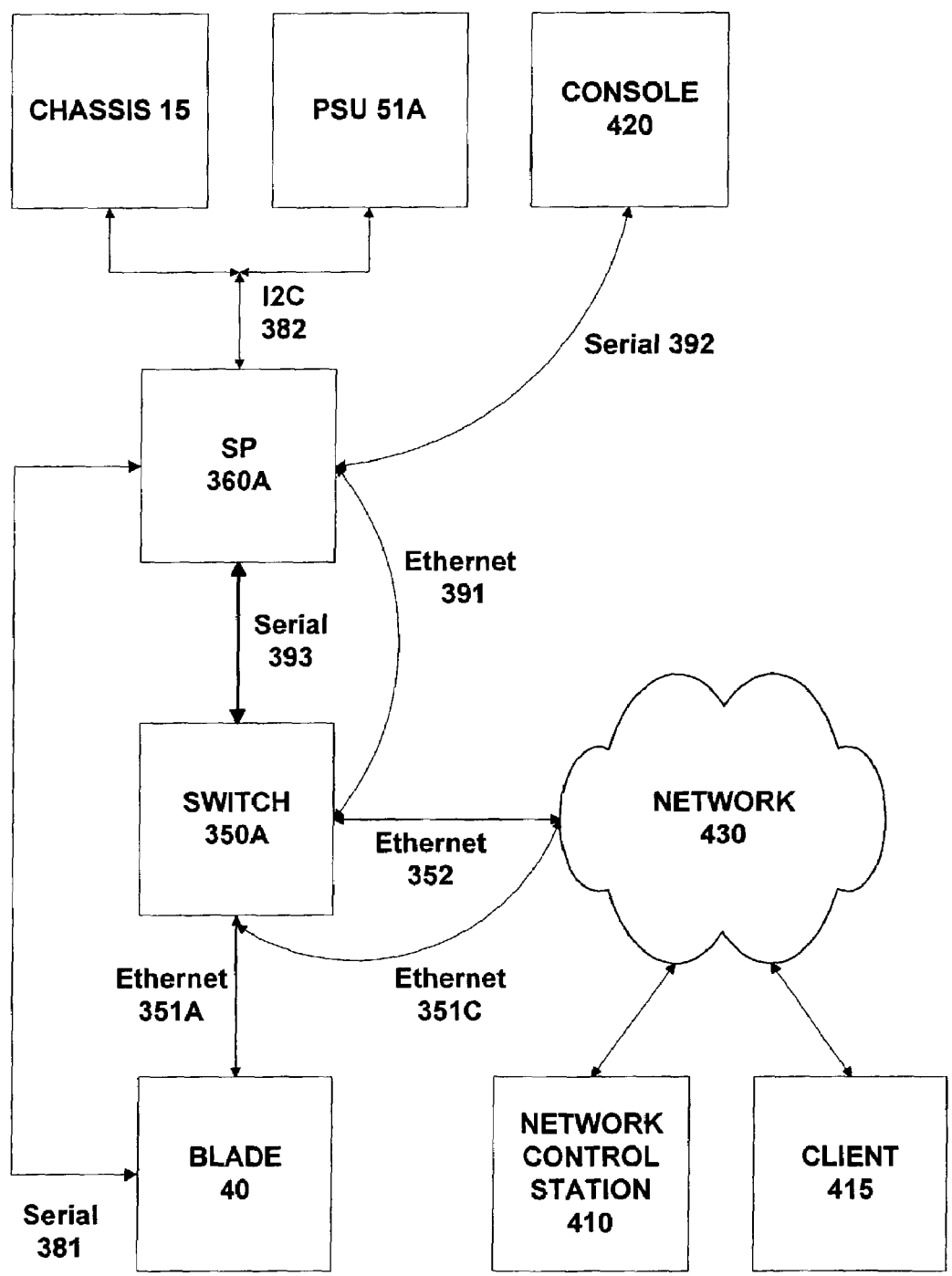
FIG. 4 is a diagram illustrating various connections involving components of the rack-mounted computer system of FIGS. 1 and 2A.

FIG. 4 illustrates some of the connections involving system 10. Note that for simplicity, FIG. 4 only includes a single switch 350A, a single service processor 360A, a single PSU 51A, and also only a single blade 40. It will be appreciated that the connections of the omitted components generally mirror the connections of the corresponding components shown. For example, each blade 40 has an Ethernet connection 351A to switch 350A and a serial link 381 to service processor 360A. In addition (although not shown in FIG. 4), each blade 40 also has a separate Ethernet connection to a second switch, and a separate serial link to the second service processor. (Note that there are no links directly from one blade to another).

Switch 350A has a serial link 393 to service processor 360A (i.e. the service processor in the same SSC, namely SSC 52A), and an Ethernet link 351C to an external network 430. Network 430 can represent any suitable form of network, such as the Internet, a corporate intranet or extranet, and so on. As shown in FIG. 4, a client 415 is attached to network 430 (only a single client is shown, but of course in practice the number of clients attached to network 430 may in fact be very large). In a typical installation, client 415 interacts via network 430, switch 350A, and Ethernet links 351A, 351C, with a Web server program running on blade 40, in order to exchange http requests and responses.

The service processor 360A is also provided with an Ethernet link 391 to network 430 via switch 350A and link 352. As previously indicated this allows remote control and configuration of system 10 from a remote terminal, such as network control station 410. Note that in some implementations, Ethernet links 352 and 351C may be connected to different networks. For example, the blades 40 may be attached to the Internet via links 351A and 351C, to act as a WorldWideWeb server, whereas for security reasons the service processor 360 may only be accessible via link 352 from an internal network.

Also shown in FIG. 4 is a serial link from service processor 360A to console 420. This typically provides a local interface for controlling system 10 (as opposed to the use of network control station 410). Service processor 360A also includes a further serial link to the second service processor (i.e. to the service processor on the other SSC, namely SSC 52B—not shown in FIG. 4). This link allows the stand-by service processor to monitor the operation of the currently active service processor, so that it can take over in the event of a fault. In addition, service processor 360A is also connected to the chassis 15 and power supply unit 50A by an I2C bus 382, for various control and diagnostic operations, as described above.

Figure 5:
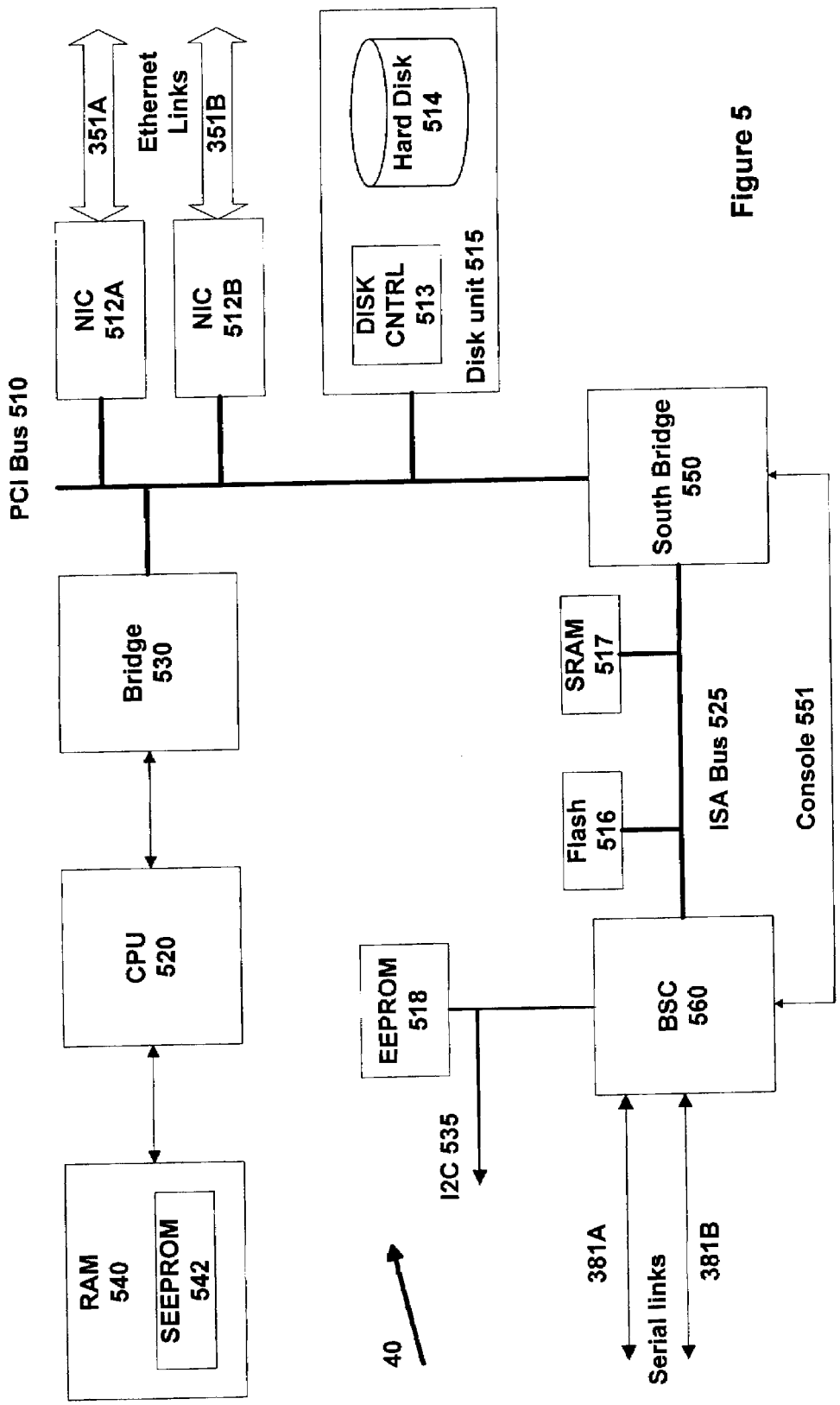
FIG. 5 is a block diagram of a blade unit as used in the rack-mounted computer system of FIGS. 1 and 2A.

FIG. 5 illustrates an example of a blade 40 for use in system 10. The overall functioning of the blade is generally managed by a CPU 520, which is connected to random access memory (RAM) 540. In one particular embodiment, RAM 540 is provided by up to four dual in-line memory modules (DIMMs). Associated with RAM 540 is a serially electrically erasable programmable read only memory (SEEPROM) 542.

The blade 40 also includes a blade service controller (BSC) 560. The BSC 560 provides control and management services for blade 40, and has a serial link to the service processor (see FIG. 3). In particular, serial link 381A runs to service processor 360A in one SSC 52A, while serial link 381B runs to the second service processor in the other SSC 52B. In this manner, whichever service processor 360 is currently active can use its respective serial link 381 to receive operational information from the blade 40, and to send appropriate control commands to the blade 40. Such commands may cause the BSC 560 to send various instructions to the CPU 520 in order to implement the operations desired by the service processor 360.

As well as serial links 381A, 381B, the BSC 560 is also linked to an I2C bus 535. This is used to monitor various operating parameters of the blade 40, such as temperature, voltage, and so on. The BSC 560 is then able to report this information back over serial link 381 to the service processor 360, or at least to alert the service processor should the data received over the I2C link indicate that there is some anomalous condition on the blade 40. The BSC is further connected to electrically erasable programmable read only memory (EEPROM) 518.

The CPU 520 is attached via bridge 530 to a PCI bus 510. Linked to the PCI bus 510 are two network interface cards, 512A, 512B, each of which is connected via a respective Ethernet link to a corresponding switch 350. Thus link 351A connects the blade 40 to switch 350A on SSC 52A, while link 351B connects the blade to the second switch on SSC 52B. These two cards therefore allow the blade 40 to transmit and receive data for normal processing operations, such as by exchanging data with other blades in system 10, or with devices such as client 415 on network 430.

Further attached to PCI bus 510 is a disk unit 515 comprising one or more hard disk drives 514 and an associated disk controller 513 (which may be integrated into the hard disk drive 514). Disk unit 515 provides local mass storage for code and data used by the blade 40. Note that such code and/or data may also be downloaded over a network link 351 for execution on CPU 520 and/or storage in disk unit 515, although in general faster access will be obtained if the desired material is already present locally on disk unit 515.

Blade 40 also incorporates a South Bridge 550, which interfaces the PCI bus 510 to an ISA bus 525. The South Bridge 550 also has a serial link 551 to the BSC 560 for providing a console input/output signal, which in turn is fed via serial link 381 to the service processor 360 (and from there to console 420 via serial link 392, as shown in FIG. 4).

Attached to the ISA bus 525 are the BSC 560, as previously discussed, plus flash memory 516 and static random access memory (SRAM) 517. The flash memory 516 is typically used to store the boot code for blade 40, and also its power-on self-test (POST) code. The boot code determines whether to load the blade 40 with an operating system and/or desired application from disk unit 515, or alternatively whether to download one or both of them over network link 351.

Note that the location of the boot code in memory is generally fixed, in that this is built into the CPU. In other words, the CPU is designed to look at start-up for the boot code at a predetermined location. However, the boot code itself may then be configured to support various options. For example, there are a variety of locations from which an operating system and application may be loaded onto the CPU 520 of blade 40, such as from one or more partitions on hard disk 514, or from a network location (such as from another blade within system 10, or possibly from some site accessible over network 430).

In one existing implementation, on power-up the boot code sends a request to BSC 560 to specify the desired boot option. BSC 560 can store this information in EEPROM 518, or in any other suitable location. BSC responds to the request by providing the CPU 520 with details of the selected boot option, which is then activated. These details may include certain options for the selected boot strategy. For example, for a network boot, the BSC may indicate whether the code should simply be downloaded for execution on the blade, or whether it should also be installed into the blade on disk unit 514 (so that it is available for a local boot next time). Note that if the boot code on the CPU 520 does not receive a response from the BSC within a predetermined time-out period, then it proceeds with a default boot option.

Typically existing systems provide a configuration utility to update boot options such as listed above. This runs on CPU 520, and can be accessed via console link 551 from console 420 or from network control station 410. In other systems, a configuration utility running on the service processor 360 can be used to select the BSC 560 for a particular blade, and to update its stored configuration details. Unfortunately, for either approach, in a system with many blades it quickly becomes very time-consuming to have to configure each blade separately, one at a time.

Thus in accordance with one embodiment of the present invention, support is provided for multiple blades to be configured en bloc. In one particular implementation, this is achieved by using the BSC 560 as a boot controller. The BSC maintains the list of boot options for the blade 40 (such as in EEPROM 518). A schematic example of such a listing is shown in Table 1 below. Note that the boot code in flash memory 516 can be configured to select and implement a boot option directly from the data in Table 1. Alternatively, this information may be made available to the boot process via some other route. This may either involve the boot process requesting the information directly from the BSC 560 (analogous to the process described above), or else copying the information from Table 1 into one or more locations accessible to boot code running on CPU 520 (and corresponding to a location where the boot code expects its data to be stored).

TABLE 1

Boot option listing

| Local/Network | Address | Order | Default | Options |
|---|---|---|---|---|
| DISK1 | | 3 | | |
| DISK1 | | | DEFAULT | |
| DISK2 | | | | |
| NET | ADDRESS1 | 1 | | RUN + INSTALL |
| NET | ADDRESS1 | 2 | | RUN |
| NET | ADDRESS2 | | | RUN |

The first column of Table 1 is used to denote whether the relevant boot option is from a local or network source. In the former case, the relevant disk (or disk partition) is also specified. The second column is then used to specify an address for a network boot, for example a URL or MAC address. Note also that a hardware address of the relevant disk unit may also be provided for the local boot options. The third column of the table provides an order of preference for the various boot options. In other words, the system will initially try the boot option denoted by "1" in this column. If this fails, it will then go to the second option, and finally to the third option. In the next column, the default option is specified. This may be used in certain cases where the boot code does not receive specific instructions. On the other hand, in other implementations this column may be omitted, and the default simply taken as the primary option as specified in the preceding column. Finally, the last column of Table 1 is used to provide further details or parameters for the various boot options. Thus in the particular example given in Table 1, certain of the network boot options are indicated as being "run+install" (where the code is downloaded and saved to local disk), whereas the others are simply just "run" (where the code is downloaded to the RAM, but not saved to disk).

Figure 6:
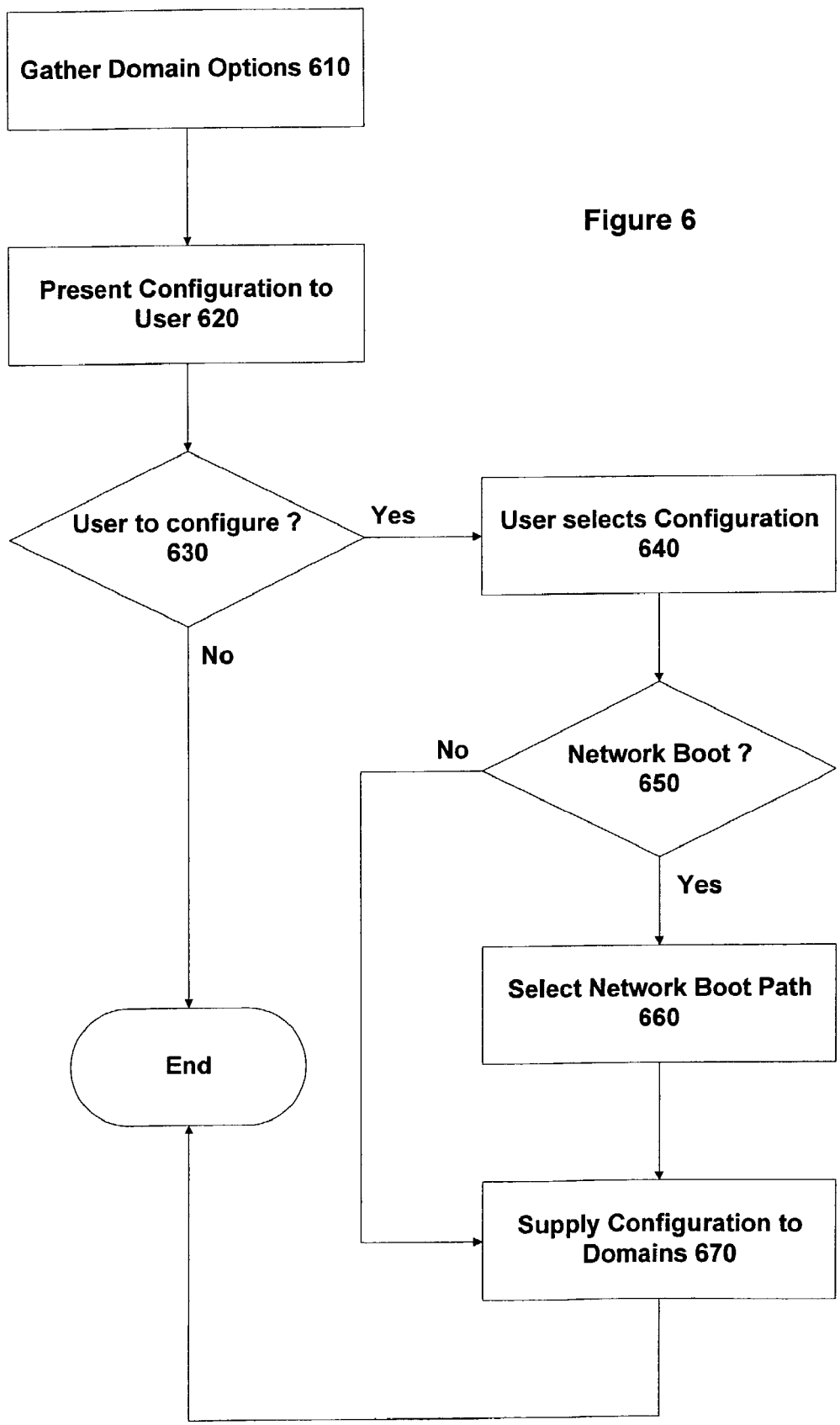
FIG. 6 is a flowchart illustrating the use of a configuration utility to control the boot process performed in the blade units within the rack-mounted computer system of FIGS. 1 and 2A.

FIG. 6 is a flow chart illustrating a boot configuration process in accordance with one embodiment of the invention, in which a configuration utility running on the service processor 360 allows a user to configure the boot options on multiple domains. This utility is typically initiated by the user when such a (re)configuration of multiple blade units 40 within system 10 is desired.

Processing begins with the utility gathering the current set of boot options for each domain (step 610). Note that the user may have already specified particular domains of interest, or the default at this stage may be to collect information for all the blade units 40 linked to the service processor in question (i.e. all blades within a given shelf). It will also be appreciated that in some instances the service processor may already have details of the boot options available for the domains. For example, this information may be stored from a previous configuration process, or the BSC 560 for each domain may, on its own initiative, send its current set of boot options to the service processor (e.g. at boot time of the domain). Nevertheless, the service processor 360 may still wish to contact the individual blades at this point, in order to confirm that the data available to the service processor is up-to-date.

The information acquired in step 610 for each domain typically corresponds to that presented in Table 1 above, although it will be appreciated that the particular details and parameters associated with the different boots option will vary from one implementation to another. Note that the listing of boot options can be saved as a table, a free-form list, or in any other appropriate form of data structure, provided that both the BSC 560 and the service processor 360 recognize the same data format. In one implementation, this is achieved by defining a predetermined, common format that is used by all of the blades in the system to communicate data such as shown in Table 1. In other embodiments, the service processor may be able to support a range of possible formats for storing boot options.

Once the service processor utility has received the boot options from the various domains, this information is presented to the user (step 620). The user is then given the choice of whether or not to update the configuration (step 630), by deleting, modifying, or adding a boot option. If the user does not want to do any configuration, the method simply terminates at this point. However, assuming that the user does want to modify the configuration, then the user specifies a particular boot option to delete, update, or add (step 640) (this can be regarded as analogous to working with a particular line within Table 1). Note that if the user is adding or modifying a network boot option (step 650), then this may be accompanied by an appropriate network boot path or other relevant configuration options (step 660).

The information provided at step 660 may be used by the blade to directly determine the boot process, or alternatively an indirect approach may be taken. Thus in many implementations, a blade may be (pre)configured to contact a dynamic host configuration protocol (DHCP) server if a network configuration and/or boot image are required, and so does not need specific advance knowledge of a specific network boot path. Rather, the blade automatically contacts the DHCP server to obtain this information.

Nevertheless, in some systems the net booting client or blade can pass arguments to the DHCP server, which can be used to indicate the response expected or desired from the DHCP server. These arguments may then be used by the blade to specify information to the DHCP server such as boot path, whether to install, and so on, and the DHCP will normally be configured to utilise this information in providing the response back to the blade. Thus in this indirect approach, the blade boot process is formally controlled by the DHCP server, but the blade can influence the outcome by initially supplying the arguments entered at step 660 to the DHCP server. It will be appreciated that the specification of a network boot path at step 660 is therefore optional, in that a blade may able to acquire and use a boot path (and other configuration information) from a default DHCP server.

The configuration specified by the user at step 640 is now supplied to the various blades (step 670). Note that there may be an option for the user to select a subset of blades to which the configuration is supplied. Also, the utility may confirm, based on the information received at step 610, that the selected blades can indeed support the chosen configuration. For example, a local boot would not generally be possible for a blade that does incorporate a hard disk drive. In other circumstances, although a blade may not already support the desired configuration option, it may nevertheless be able to accommodate it. For example, if the desired configuration involves a network boot from a particular network path that is not already listed in the configuration table for the domain, then this path can be added as a new entry to the configuration table. Alternatively, if the specified configuration corresponds to a local boot of software that is not currently available on a blade, then the system may ask whether it should install this software onto the blade from the network, whereupon it will be usable in the future as a local boot option.

It will also be appreciated that rather than supplying configuration details at steps 660 and/or 670 to the blades, this information could instead be passed to and stored at the relevant DHCP server. It would then be invoked whenever the associated blade units contacted the DHCP server for configuration information as part of their boot process.

Figure 7:
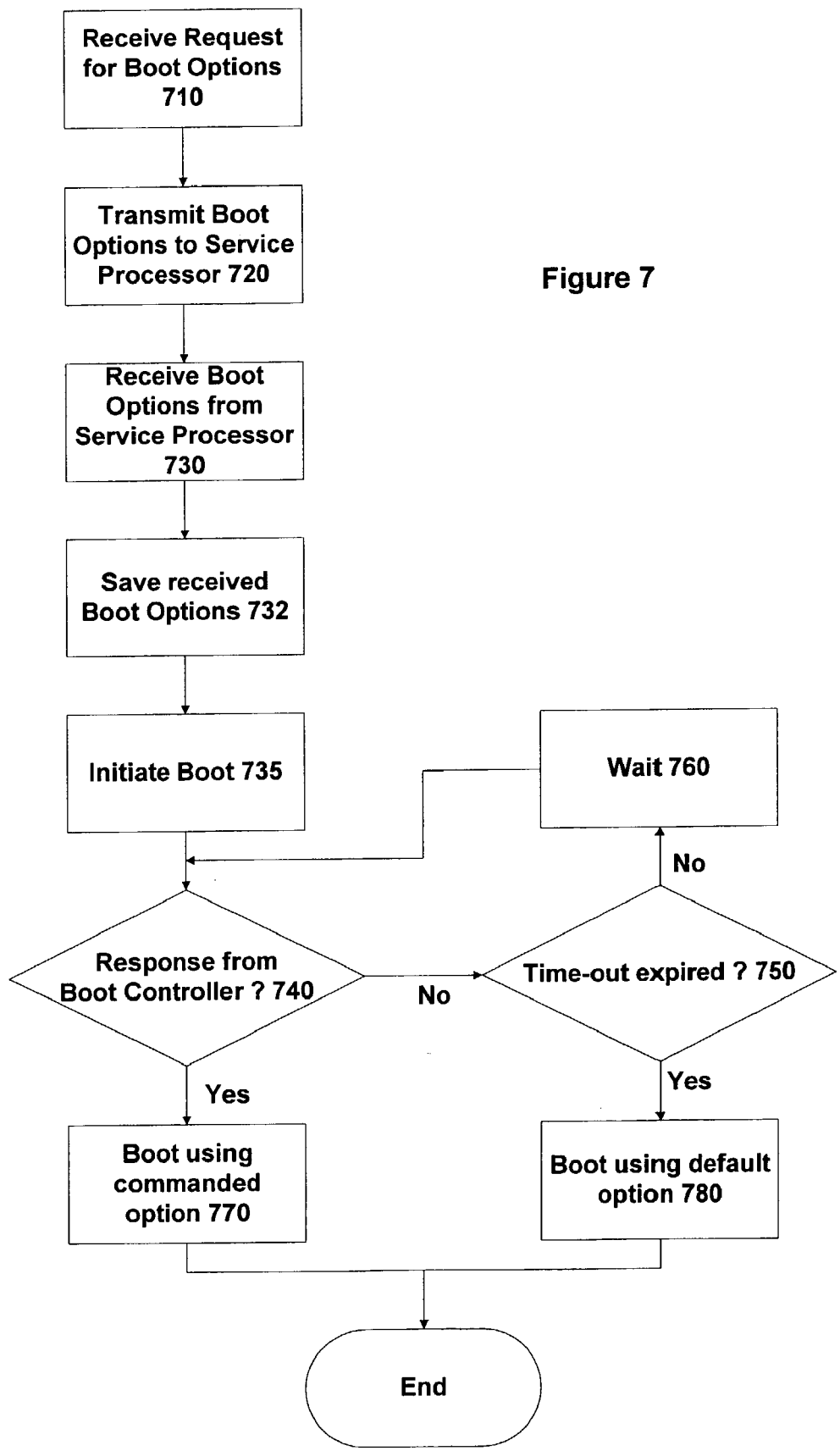
FIG. 7 is a flowchart illustrating the operations performed on a blade 40 corresponding to the configuration process of FIG. 6.

FIG. 7 illustrates the operations that are performed on a blade unit 40 in counterpart with the processing of FIG. 6 (which as previously indicated typically occurs on a service processor 360). Thus the BSC 560 initially receives a request from the configuration utility for the listing of available boot options on that device (step 710). Accordingly, the configuration information for the blade is transmitted back to the service processor in some suitable format, such as a data structure corresponding to Table 1 above. (It will be appreciated that these two steps, i.e. step 710 and step 720, correspond to the gathering of domain options represented by step 610 in the flowchart of FIG. 6).

Once the user has specified the configuration options on the service processor, this information is supplied back from the service processor (at step 670 in FIG. 6) and is duly received at the relevant blades (at step 730). The specified configuration is then saved by the BSC 560 (step 732), which typically involves updating the configuration information already available at the blade.

At some future point, a (re)-boot of the blade is initiated (step 735). One possibility is that the user triggers a re-boot from the configuration utility running on the service processor 360 immediately after supplying the new configuration data to the blades. Alternatively, such a re-boot may be deferred, for example, until the current processing on the blade has completed.

Once the boot process is initiated, in one embodiment the boot code asks the BSC (operating in effect as a boot controller) to specify which configuration the blade should adopt. If a response is received in good time from the boot controller (step 740), then the blade boots using the specified boot option (step 770). Note that multiple options may in fact be specified, as a primary option, a secondary option, and so on. These would each be tried in turn (starting with the primary option), until the boot was successfully achieved.

Alternatively, if no response is received, processing goes into a wait loop (step 760). In the event that a time-out then expires (step 750) prior to receipt of boot information from the boot controller, the blade boots using its default boot option (step 780). The default boot option may also be used if the boot option(s) specified by the boot controller at step 740 are all unsuccessful.

It will be appreciated that the above approach provides a convenient and efficient way for a user to automatically reconfigure multiple blades within system 10. Note that in the particular embodiment described, where the configuration utility runs on service processor 360, the reconfiguration is generally limited to those blades that are directly connected to the service processor (in other words those that are within the same shelf). Thus each shelf of system 10 would typically be configured separately, using a utility running on the service processor for that shelf It will be appreciated that in a system with a relatively large number of blades per shelf (say 16), this provides a significant benefit in terms of reduced user effort required for reconfiguration. Furthermore one can envisage an embodiment in which an overall system configuration utility is implemented that receives configuration data from multiple service processors and then is able to specify a configuration back to these service processors (en bloc), and through them to their associated blades.

The above approach is well-suited to management of a web hosting service, such as may be implemented on a server farm. In this situation, much of the processing described with reference to FIGS. 6 and/or 7 may be automated. Thus consider for example an installation comprising 30 systems, which provide between them a total capacity of approximately 1000 web hits per minute. The web hosting firm typically maintains a database storing information about the installation, such as the capacity of each individual system. Now let us consider the situation where it is desired to provide a first customer (say customer A) with a capacity of 300 hits/minute for a particular application, and a second customer (customer B) with a capacity of 500 hits/minute for a particular application.

Figure 8:
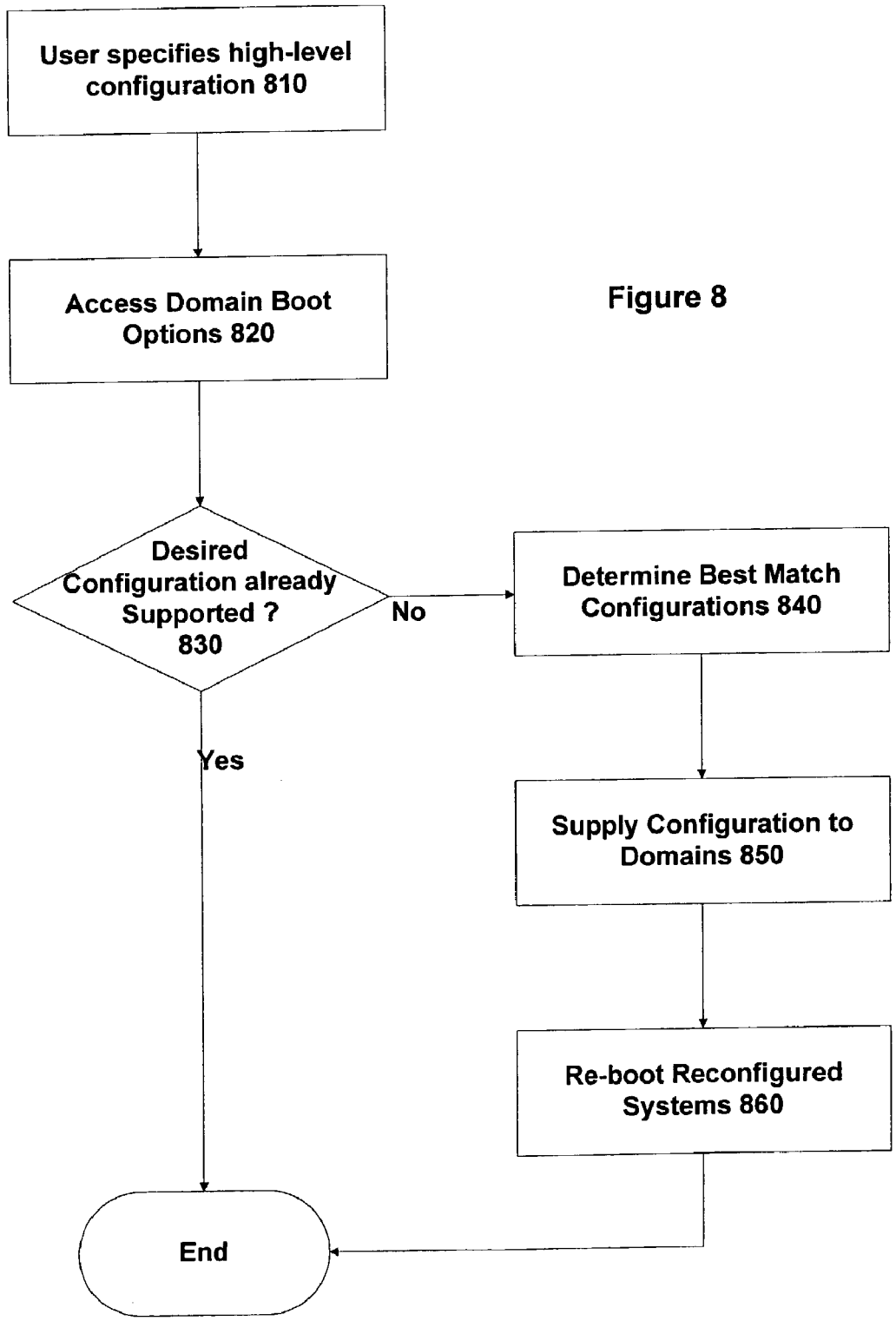
FIG. 8 is a flowchart illustrating operations performed by a configuration utility to initialize the configuration in a multi-domain system.

The procedure to allow a centralized configuration for this is illustrated in the flow-chart of FIG. 8. The method commences with the user specifying the desired customer configuration (step 810), in other words 300 hits/minute for Customer A and 500 hits/minute for Customer B. The particular application (and associated operating system) desired by each of the customers is also specified.

The boot information for each domain is then accessed (step 820). This may involve polling the various domains for their current boot configuration (analogous to step 610 in FIG. 6), or this information may have already been obtained, so that it is available in some configuration database.

The system then determines from the accessed configuration information whether or not the desired resources are already in place (step 830) in order to match the customer requirements. If so, then no further configuration is necessary, and so processing can terminate (i.e. the systems are allowed to maintain their current status). On the other hand, assuming that the current configuration does not match that required by the customer(s), the system determines the best way (or at least an acceptable way) to provide such support (step 840).

In one particular embodiment, this matching is done by trying to find domains that are closest to already providing the desired configuration. Typically, first preference are those domains where the relevant application for the customer is already resident, but is not configured as the normal boot option. In this case the desired configuration can be achieved by simply modifying the boot options on the system. Second preference are those domains that do not have the application installed, but do have the operating system appropriate to the application. These can be converted to the desired configuration by installing the relevant application. Third preference are domains that do not have either the desired application or the relevant operating system installed, since in this case both the operating system and application must be loaded.

If the configuration utility simply has to find capacity for a single customer application, then it can assemble the desired capacity from first preference domains, then second preference domains if the first preference domains do not have sufficient capacity by themselves, and finally third preference domains if the first and second preference domains still do not have sufficient capacity between them. If multiple Customers have to be satisfied, then a more complex matching algorithm may be used in order to provide an optimum (or at least adequate) overall allocation. This can be done according to various suitable criteria, such as minimising the amount of code to be installed, minimising the amount of operating system switches, and so on.

Once the allocation of domains to customers has been determined, then the relevant configuration options are downloaded (step 850) to each of the domains concerned (except for those domains whose configuration already matches their allocation). For a first preference domain, the reconfiguration typically involves setting the domain to boot off the appropriate disk (partition) in order to access the desired operating system and application program. For a second or third preference domain, the reconfiguration typically involves setting the domain to perform a network boot. In addition, the domain is supplied with appropriate arguments to pass to the DHCP server (as described above) as part of the network boot. Thus for a second preference domain, the arguments specify to install the desired application, whereas for a third preference domain, the arguments specify to install both the desired application and also the relevant operating system. The (re)configured domains are then reset, so that they re-boot (step 860) with the desired application and operating system, thereby setting the overall system into desired state to support the various customers.

Figure 9:
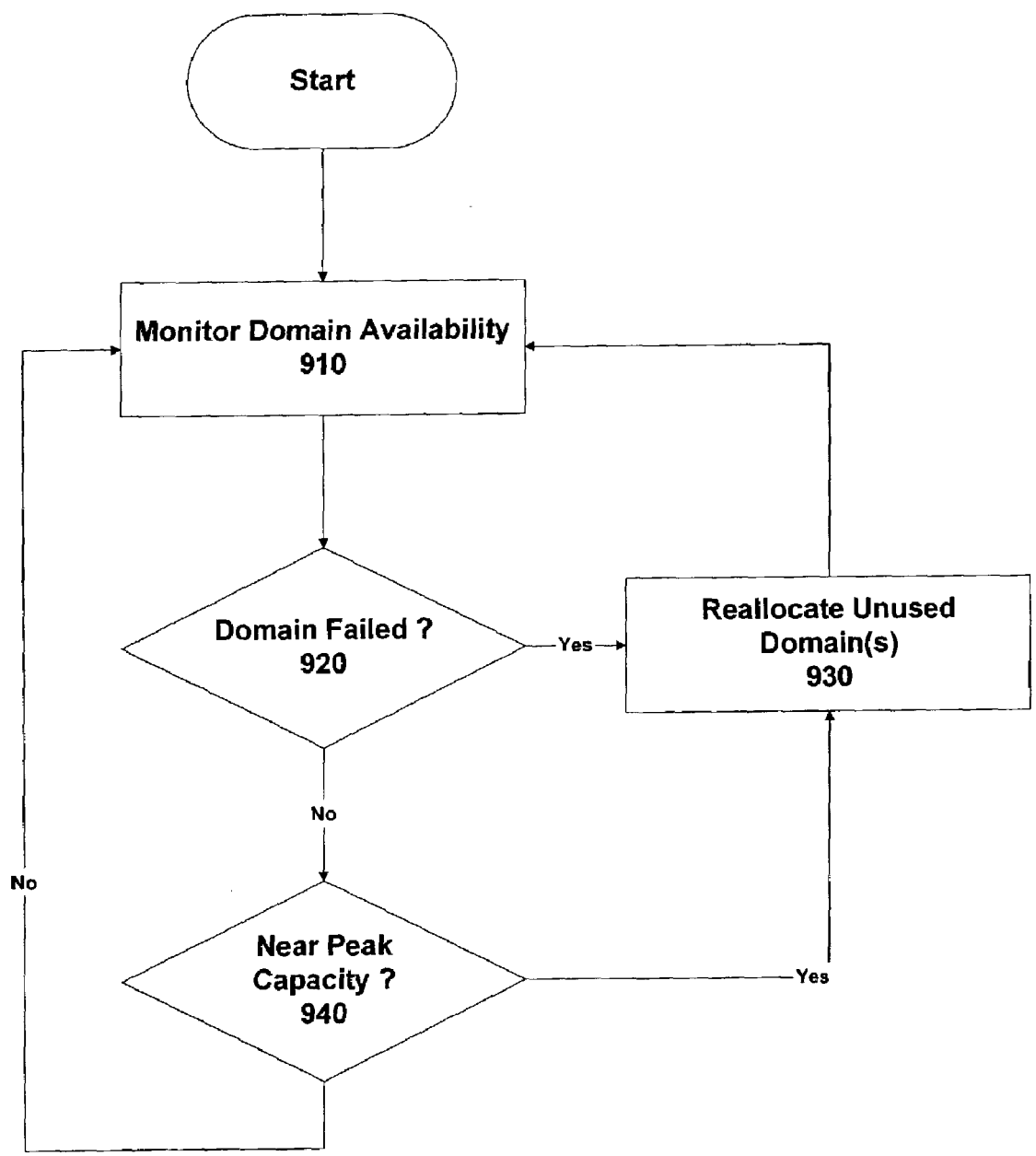
FIG. 9 is a flowchart illustrating operations performed by a configuration utility to monitor and update the configuration in a multi-domain system.

After the system has been configured using the approach of FIG. 8, a service utility or other such program can monitor operations to ensure that correct behaviour is maintained. This procedure is illustrated by the flowchart of FIG. 9, which commences with monitoring system operations (step 910). If it is detected that a domain has failed (step 920), then a spare domain can be automatically configured to replace it (step 930), thereby maintaining overall capacity for this customer. (Note that a failed system may have to be replaced by multiple spare systems, if the domains vary in size or processing power from one domain to another). The failure of the domain concerned is recorded in the configuration database or other suitable location, so that no attempt is made to reassign this domain until it has been repaired.

The configuration of a spare domain can be performed using a broadly analogous approach to that described with reference to FIG. 8 above. Thus domain information is accessed, and if there is already an existing (spare) domain having the desired configuration, then it can be brought on-line for the customer straightaway. Alternatively, it may be necessary to first (re)configure a spare domain, and then to re-boot the newly configured domain, thereby allowing it to act as a replacement for the failed domain. Note that this may all be done automatically by the service utility, without the need for human intervention.

The monitoring process also checks to see whether demand is approaching maximum for a particular customer application (step 940). If so, then again the service utility may respond automatically by allocating one or more spare domains to the relevant application (step 930). As before, this may involve (re)configuring the spare domain(s) as appropriate, in order to support the desired application.

Of course, it may be in some circumstances that all the domains are allocated. In this case, the allocation of step 930 may simply fail, since there are no spare domains. Alternatively, a more involved rebalancing may be performed (such as by "borrowing" a domain from a presently under-utilised customer), dependent upon how flexible the various allocations are (the host may be contractually bound to supply a customer with a minimum number of systems, even if they are not all in fact in use).

A further possibility is that a reconfiguration of domains may be performed due to a planned re-allocation of resources. For example, at least some of the capacity assigned to Customer A may be switched at a certain date or time to Customer B. Again, the configuration utility allows such modifications to be performed en bloc to multiple domains, to reflect customer requirements. Note that as a precaution however, at a lower level the utility may implement the reconfiguration a domain at a time. In other words, the utility may switch a first domain, by re-configuring and then re-booting, then a second domain, then a third, and so on, until all the desired capacity has been transferred. The advantage of doing this, rather than instructing multiple domains to all transfer at the same time, is to avoid sudden congestion of the (internal) network used for application installation. (Note that similar considerations also apply for an initial multi-domain configuration).

It will be appreciated that in many circumstances, the boot process needed to set a system into a desired configuration is different from that needed to maintain it there. Thus reconfiguration typically involves a domain having to boot a new application from some network location. However, once this has been done, and assuming that the boot process included a local install, subsequent rebooting can be performed using this local version of the code, rather than repeating the network boot.

There are various mechanisms whereby this can be achieved automatically, without the user having to specifically reset the boot parameters. One possibility, as mentioned above, is for the local boot to be the primary option, and the network boot to be the secondary option. In this situation, the local boot fails when the system is first reconfigured (assuming that the application in question is not yet locally available), leading to a network boot and install. However, for subsequent boots the primary option will indeed be successful. Another possibility is for the configuration utility to supply two boot settings to the boot controller for a domain—the first to be used at the next re-boot, and the second to be used thereafter. The skilled person will be aware of other appropriate mechanisms to achieve analogous results.

In conclusion, although the approach described herein is typically intended for use in a computer system, it is applicable to a wide variety of computing systems (mainframe, server, workstation, desktop, laptop, handheld, etc.), plus a great range of electronic systems (e.g. telecommunications apparatus, household electronic devices such as televisions and DVD players, subsystems for transport devices such as cars and aeroplanes, and so on). Thus while a variety of particular embodiments have been described in detail herein, it will be appreciated that this is by way of exemplification only. The skilled person will be aware of many further potential modifications and adaptations that fall within the scope of the claimed invention and its equivalents.

The invention claimed is:

1. Apparatus comprising multiple domains, wherein each domain has an independent boot process, and wherein said boot process involves the selection of one boot option from a list of boot options available to the domain, said apparatus further comprising:
   a configuration utility;
   a boot controller within each domain, configured to supply said configuration utility with the list of boot options available to that domain;
   wherein the configuration utility is configured to specify en bloc the boot option for multiple domains; and
   the boot controller within each domain, further configured to cause the domain to boot in accordance with the boot option specified by said configuration utility.

2. The apparatus of claim 1, wherein the boot controller supplies the configuration utility with the list of boot options available to that domain in response to a request from the configuration utility.

3. The apparatus of claim 1, wherein one of said boot options is identified as a default option, and a domain boots in accordance with the default option if it does not receive instructions to the contrary within a predetermined time.

4. The apparatus of claim 1, wherein one of said boot options is a network boot option, and the configuration utility is operable to specify the network address for the network boot option.

5. The apparatus of claim 1, the boot controller is operable to store said list of boot options for that domain.

6. The apparatus of claim 1, wherein the configuration utility is operable to specify primary and secondary boot options, and wherein the boot controller causes the domain to boot in accordance with the secondary boot option if the primary boot option is unavailable.

7. The apparatus of claim 1, wherein the boot controller supplies the configuration utility with the list of boot options available to that domain at boot time.

8. Apparatus comprising a domain for use in a multi-domain system including a shared configuration utility, said domain comprising:
   a boot process, wherein said boot process is operable to select one boot option from a list of boot options available to the domain; and
   a boot controller within each domain, wherein said boot controller is configured to supply said configuration utility with the list of boot options available to that domain;
   wherein the boot controller is further configured to cause the domain to boot in accordance with a boot option specified by said configuration utility, said boot option being common for multiple domains.

9. The apparatus of claim 8, wherein the boot controller supplies the configuration utility with the list of boot options available to that domain in response to a request from the configuration utility.

10. The apparatus of claim 8, wherein one of said boot options is identified as a default option, and the domain boots in accordance with the default option if it does not receive instructions to the contrary within a predetermined time.

11. The apparatus of claim 8, wherein the boot controller is operable to store said list of boot options for that domain.

12. The apparatus of claim 8, wherein the boot controller causes the domain to boot in accordance with a secondary boot option if a primary boot option is unavailable.

13. The apparatus of claim 8, wherein the boot controller supplies the configuration utility with the list of boot options available to that domain at boot time.

14. A method of managing apparatus comprising a configuration utility and multiple domains, wherein each domain has an independent boot process and a boot controller, and wherein said boot process involves the selection of one boot option from a list of boot options available to the domain, the method comprising:
   supplying from each boot controller to the configuration utility the list of boot options available to the domain;
   using the configuration utility to specify en bloc a boot option for multiple domains;
   and causing each domain to boot in accordance with the boot option specified by said configuration utility.

15. The method of claim 14, wherein the boot controller supplies the configuration utility with the list of boot options available to that domain in response to a request from the configuration utility.

16. The method of claim 14, further comprising identifying one of said boot options as a default option, and booting the domain in accordance with the default option if instructions to the contrary are not received within a predetermined time.

17. The method of claim 14, wherein one of said boot options is a network boot option, and the configuration utility is operable to specify the network address for the network boot option.

18. The method of claim 14, further comprising the boot controller storing said list of boot options for that domain.

19. The method of claim 14, further comprising the configuration utility specifying primary and secondary boot options, and the boot controller causing the domain to boot in accordance with the secondary boot option if the primary boot option is unavailable.

20. The method of claim 14, wherein the boot controller supplies the configuration utility with the list of boot options available to that domain at boot time.

21. A method of operating a domain for use in a multi-domain system including a shared configuration utility, wherein each domain has an independent boot process and a boot controller, and wherein said boot process involves the selection of one boot option from a list of boot options available to the domain, the method comprising:
   supplying from the boot controller to the configuration utility the list of boot options available to that domain in a predetermined format;
   and causing the domain to boot in accordance with the boot option specified by said configuration utility, said boot option being common for multiple domains.

22. The method of claim 21, wherein the boot controller supplies the configuration utility with the list of boot options available to that domain in response to a request from the configuration utility.

23. The method of claim 21, further comprising identifying one of the boot options as a default option, and causing the domain to boot in accordance with the default option if instructions to the contrary are not received within a predetermined time.

24. The method of claim 21, further comprising the boot controller storing said list of boot options for the domain.

25. The method of claim 21, further comprising booting the domain in accordance with a secondary boot option if a primary boot option is unavailable.

26. The method of claim 21, wherein the boot controller supplies the configuration utility with the list of boot options available to that domain at boot time.

27. A computer program product comprising instructions on a storage medium for loading into an apparatus comprising multiple domains, in which each domain supports an independent boot process involving the selection of one boot option from a list of boot options available to the domain, said instructions implementing a configuration utility that is operable to:
   receive from a boot controller on each domain a list of the boot options available to that domain;
   specify en bloc the boot option for the multiple domains; and
   inform the respective boot controllers of the specified boot option, wherein the boot controllers are operable to cause the domains to boot in accordance with the boot option specified by said configuration utility.

28. The computer program product of claim 27, wherein the instructions cause the configuration utility to request the list of available boot options from the respective boot controllers.

29. The computer program product of claim 27, wherein the instructions cause the configuration utility to specify the network address for a network boot option.

30. The computer program product of claim 27, wherein the instructions cause the configuration utility to specify a primary and secondary boot option.

31. The computer program product of claim 27, wherein the lists of boot options available to a domain are received at the configuration utility from the domains in a predetermined common format.

32. Apparatus comprising multiple domains, wherein each domain has an independent boot process, and wherein said boot process involves the selection of one boot option from a list of boot options available to the domain, said apparatus further comprising:
   means for configuring the apparatus;
   means for supplying the means for configuring with the list of boot options available to each domain;
   wherein the means for configuring specifies en bloc the boot option for multiple domains; and
   means for causing each domain to boot in accordance with the boot option specified by said means for configuring.

* * * * *